US012672182B2

(12) United States Patent
Chang

(10) Patent No.: US 12,672,182 B2
(45) Date of Patent: Jun. 30, 2026

(54) OPERATION METHOD OF SIDELINK RELAY, AND SIDELINK RELAY THEREFOR

(71) Applicant: ELECTRONICS AND TELECOMMUNICATIONS RESEARCH INSTITUTE, Daejeon (KR)

(72) Inventor: Sung Cheol Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 600 days.

(21) Appl. No.: 18/084,907

(22) Filed: Dec. 20, 2022

(65) Prior Publication Data

US 2023/0199877 A1    Jun. 22, 2023

(30) Foreign Application Priority Data

Dec. 20, 2021    (KR) ........................ 10-2021-0182719

(51) Int. Cl.
| | |
|---|---|
| *H04W 76/14* | (2018.01) |
| *H04W 72/25* | (2023.01) |
| *H04W 76/11* | (2018.01) |
| *H04W 88/04* | (2009.01) |

(52) U.S. Cl.
CPC ........... *H04W 76/14* (2018.02); *H04W 72/25* (2023.01); *H04W 76/11* (2018.02); *H04W 88/04* (2013.01)

(58) Field of Classification Search
CPC ..... H04W 72/25; H04W 76/11; H04W 76/14; H04W 84/047; H04W 88/04; H04W 92/10; H04W 92/18
See application file for complete search history.

(56) References Cited

U.S. PATENT DOCUMENTS

| | | | | |
|---|---|---|---|---|
| 10,805,858 | B2 | 10/2020 | Loehr et al. | |
| 11,533,673 | B1 * | 12/2022 | Pan ........................ | H04W 40/22 |
| 2019/0166486 | A1 * | 5/2019 | Tang ........................ | H04W 8/24 |
| 2019/0357280 | A1 * | 11/2019 | Lee ........................ | H04W 8/26 |
| 2020/0008173 | A1 * | 1/2020 | Kim ........................ | H04W 76/10 |
| 2020/0022194 | A1 * | 1/2020 | Wang ................... | H04W 76/12 |
| 2020/0100308 | A1 * | 3/2020 | Lee ........................ | H04W 76/25 |
| 2021/0204274 | A1 * | 7/2021 | Paladugu ................ | H04L 69/22 |
| 2021/0315057 | A1 | 10/2021 | Baek et al. | |
| 2021/0352767 | A1 * | 11/2021 | Paladugu .............. | H04W 88/04 |
| 2021/0410215 | A1 | 12/2021 | Kuo | |

(Continued)

FOREIGN PATENT DOCUMENTS

| | | | | | |
|---|---|---|---|---|---|
| EP | | 3500046 B1 * | 5/2024 | ........... | H04W 40/22 |
| WO | | 2018143763 A1 | 8/2018 | | |
| WO | | 2022017348 A1 | 1/2022 | | |

*Primary Examiner* — Thomas R Cairns
(74) *Attorney, Agent, or Firm* — Rabin & Berdo, P.C.

(57) ABSTRACT

An operation method of a first terminal for establishing a relay connection may comprise: generating a PC5-RAL PDU header for the first terminal, the PC5-RAL PDU header including or not including a remote terminal identifier and a connection identifier; mapping the generated PC5-RAL PDU header to a PC5-radio link control (RLC) channel; and generating a PC5-RAL PDU by adding data to the PC5-RAL PDU header, and transmitting the generated PC5-RAL PDU to a corresponding second terminal through the PC5-RLC channel, wherein the first terminal is a remote terminal or a relay terminal, and the second terminal is a relay terminal or a remote terminal.

11 Claims, 14 Drawing Sheets

(56) References Cited

U.S. PATENT DOCUMENTS

| | | | |
|---|---|---|---|
| 2022/0007445 A1 | 1/2022 | Pan et al. | |
| 2022/0022279 A1 | 1/2022 | Kim | |
| 2022/0095411 A1* | 3/2022 | Lin | H04W 76/27 |
| 2022/0124573 A1* | 4/2022 | Tsai | H04W 36/0079 |
| 2022/0418015 A1* | 12/2022 | Paladugu | H04W 76/15 |
| 2023/0073469 A1* | 3/2023 | Wang | H04W 72/1263 |
| 2023/0084233 A1* | 3/2023 | Pan | H04W 76/14 |
| | | | 370/329 |
| 2023/0148166 A1* | 5/2023 | Kuo | H04W 40/22 |
| | | | 370/328 |
| 2023/0164665 A1* | 5/2023 | Zhao | H04W 40/246 |
| | | | 370/315 |
| 2023/0337299 A1* | 10/2023 | Zhang | H04L 45/66 |
| 2023/0370945 A1* | 11/2023 | Chen | H04W 76/14 |
| 2024/0172244 A1* | 5/2024 | Pan | H04W 76/14 |
| 2024/0205989 A1* | 6/2024 | Kang | H04W 76/27 |
| 2024/0267826 A1* | 8/2024 | Pan | H04W 8/26 |

* cited by examiner

OPERATION METHOD OF SIDELINK RELAY, AND SIDELINK RELAY THEREFOR

CROSS-REFERENCE TO RELATED APPLICATIONS

This application claims priority to Korean Patent Application No. 10-2021-0182719, filed on Dec. 20, 2021, with the Korean Intellectual Property Office (KIPO), the entire contents of which are hereby incorporated by reference.

BACKGROUND

1. Technical Field

Exemplary embodiments of the present disclosure relate to a sidelink relay, and more specifically, to a method for an adaptation layer to configure a relay connection and a protocol data unit (PDU) in a sidelink relay relaying between a sidelink link and a Uu link, and the sidelink relay using the same.

2. Related Art

In a mobile communication system, a base station connected to a network can provide a radio connection to a terminal moving within a predetermined coverage. The terminal can be bidirectionally connected to the network through a process of bidirectionally exchanging data with the connected base station. The moving terminal can maintain connection with the network by changing a connected base station in a handover scheme. The base station may play a role of proactively managing resources within a coverage providing a connection to the terminal. The terminal managed by the base station can exchange data with the base station through a process of transmitting and receiving radio signals using allocated resources.

The base station may be configured variously according to the size of its coverage providing connectivity. Base stations providing various coverages may be overlapped and provide radio accesses to terminals. In general, the size of the coverage provided by the base station depends on a frequency, and decreases as the frequency increases. A plurality of transmission and reception points (TRPs) are devices that transmit and receive radio signals to and from a terminal, constitute a part of the base station, and may constitute the base station at the same location or distributed locations. The base station may be configured in a centralized manner for radio access functions or in a distributed manner for the functions. The base station whose radio access functions are distributed may be configured with a central unit (CU) providing upper functions and at least one distributed unit (DU) providing lower functions.

SUMMARY

An objective of the present disclosure for resolving the above-described problem is to provide an operation method of a remote terminal for sidelink relaying operations.

Another objective of the present disclosure for resolving the above-described problem is to provide an operation method of a relay terminal for sidelink relaying operations.

Yet another objective of the present disclosure for resolving the above-described problem is to provide an operation method of a base station for sidelink relaying operations.

According to a first exemplary embodiment of the present disclosure for achieving the objective, an operation method of a first terminal for establishing a relay connection may comprise: generating a PC5-relay adaptation layer (PC5-RAL) protocol data unit (PDU) header for the first terminal, the PC5-RAL PDU header including or not including a remote terminal identifier and a connection identifier; mapping the generated PC5-RAL PDU header to a PC5-radio link control (RLC) channel; and generating a PC5-RAL PDU by adding data to the PC5-RAL PDU header, and transmitting the generated PC5-RAL PDU to a corresponding second terminal through the PC5-RLC channel, wherein the first terminal is a remote terminal or a relay terminal, and the second terminal is a relay terminal or a remote terminal.

The remote terminal identifier may be a local remote terminal identifier determined by a base station and delivered to the first terminal or the second terminal.

The first terminal may determine the PC5-RLC channel mapped to the remote terminal identifier and the connection identifier, or the first terminal may determine the PC5-RLC channel mapped to the connection identifier.

The first terminal may determine a PC5-layer 2 (L2) identifier mapped to the remote terminal identifier.

The operation method may further comprise activating a PC5-RAL in the first terminal or the second terminal, wherein the remote terminal identifier and the connection identifier may be configured in the activating of the PC5-RAL.

The first terminal may configure the PC5-RAL PDU using the PC5-RAL PDU header not including the remote terminal identifier and the connection identifier, or configure the PC5-RAL PDU using the PC5-RAL PDU header including the remote terminal identifier and the connection identifier, for a relay-Uu-radio resource control (R-Uu-RRC) message which is a signaling message.

According to a second exemplary embodiment of the present disclosure for achieving the objective, an operation method of a first communication node for establishing a relay connection may comprise: generating a Uu-relay adaptation layer (Uu-RAL) protocol data unit (PDU) header for the first communication node, the Uu-RAL PDU header including a remote terminal identifier and a connection identifier; mapping the generated Uu-RAL PDU header to a Uu-radio link control (RLC) channel; and generating a Uu-RAL PDU by adding data to the Uu-RAL PDU header, and transmitting the generated Uu-RAL PDU to a corresponding second communication node through the Uu-RLC channel, wherein the communication node is a relay terminal or a base station, and the second communication node is a base station or a relay terminal.

The remote terminal identifier may be determined by a base station and delivered to a relay terminal, and the first communication node may determine the Uu-RLC channel mapped to the remote terminal identifier and the connection identifier.

The operation method may further comprise activating a Uu-RAL in the first communication node or the second communication node, wherein the remote terminal identifier and the connection identifier may be configured in the activating of the Uu-RAL.

According to a third exemplary embodiment of the present disclosure for achieving the objective, an operation method of a relay terminal for establishing a relay connection may comprise: identifying a remote terminal identifier and a connection identifier in a first relay adaptation layer (RAL); generating, in a second RAL, an RAL protocol data unit (PDU) header including or not including the remote terminal identifier and the connection identifier; mapping the generated RAL PDU header to a radio link control (RLC)

channel; and adding data to the RAL PDU header of the second RAL to generate an RAL PDU of the second RAL, and transmitting the generated RAL PDU to a corresponding communication node through the RLC channel, wherein the first RAL is a PC5-RAL or a Uu-RAL, the second RAL is a Uu-RAL or a PC5-RAL, and the communication node is a remote terminal or a base station.

The first RAL may identify the remote terminal identifier and the connection identifier from a received RAL PDU header.

The first RAL may identify the remote terminal identifier and the connection identifier associated with an RLC channel through which a received RAL PDU is transmitted.

An RAL PDU header received in the first RAL may be delivered to the second RAL, and the second RAL may generate the RAL PDU of the second RAL by using the received RAL PDU header identically.

The operation method may further comprise activating the first RAL and the second RAL in the relay terminal, wherein the remote terminal identifier and the connection identifier may be configured in the activating of the first RAL and the second RAL.

The operation method may further comprise: extracting, by the first RAL, data by removing an RAL PDU header from a received RAL PDU; delivering, by the first RAL, the data to the second RAL; and generating, by the second RAL, an RAL PDU only with the data, or generating, by the second RAL, an RAL PDU with the data and an RAL PDU header including the remote terminal identifier and the connection identifier.

According to a fourth exemplary embodiment of the present disclosure for achieving the objective, an operation method of a remote terminal for establishing a relay connection may comprise: generating an R-Uu-radio resource control (RRC) message that is a signaling message to be transmitted to a base station through a relay terminal; and transmitting the generated signaling message to the relay terminal using a PC5-relay adaptation layer (PC5-RAL), wherein the signaling message may be a signaling message using a relay-signaling radio bearer 0 (R-SRB0), and the R-Uu-RRC message may be transmitted without using a remote terminal identifier and a connection identifier in the PC5-RAL configured in the remote terminal.

In the remote terminal, the PC5-RAL may be located between an R-Uu-packet data convergence protocol (PDCP) layer and a PC5-radio link control (PC5-RLC) layer.

The relay connection may be an end-to-end (E2E) bearer established between the remote terminal and a base station.

According to the exemplary embodiments of the present disclosure, operation methods of an adaptation layer for a SL relay are provided. Accordingly, the performance of the communication system can be improved.

BRIEF DESCRIPTION OF DRAWINGS

FIG. 4 is a conceptual diagram for describing a protocol configuration for each interface in an environment including a remote terminal, a relay terminal, and a base station.

FIG. 5 is a conceptual diagram illustrating mapping between a connection identifier, which is used in a remote terminal, a relay terminal, and a base station, and a PC5 RLC channel ID or Uu RLC channel ID.

FIG. 6 is a conceptual diagram for describing a method of including a connection identifier in a RAL PDU header in the PC5-RAL.

FIG. 10 is a conceptual diagram illustrating a protocol configuration of a relay connection for signaling message transmission.

FIG. 14 is a conceptual diagram for describing a protocol structure configured for exchanging an R-SRB0 signaling message between a remote terminal and a base station without using a RAL layer.

DETAILED DESCRIPTION OF THE EMBODIMENTS

Figure 1:
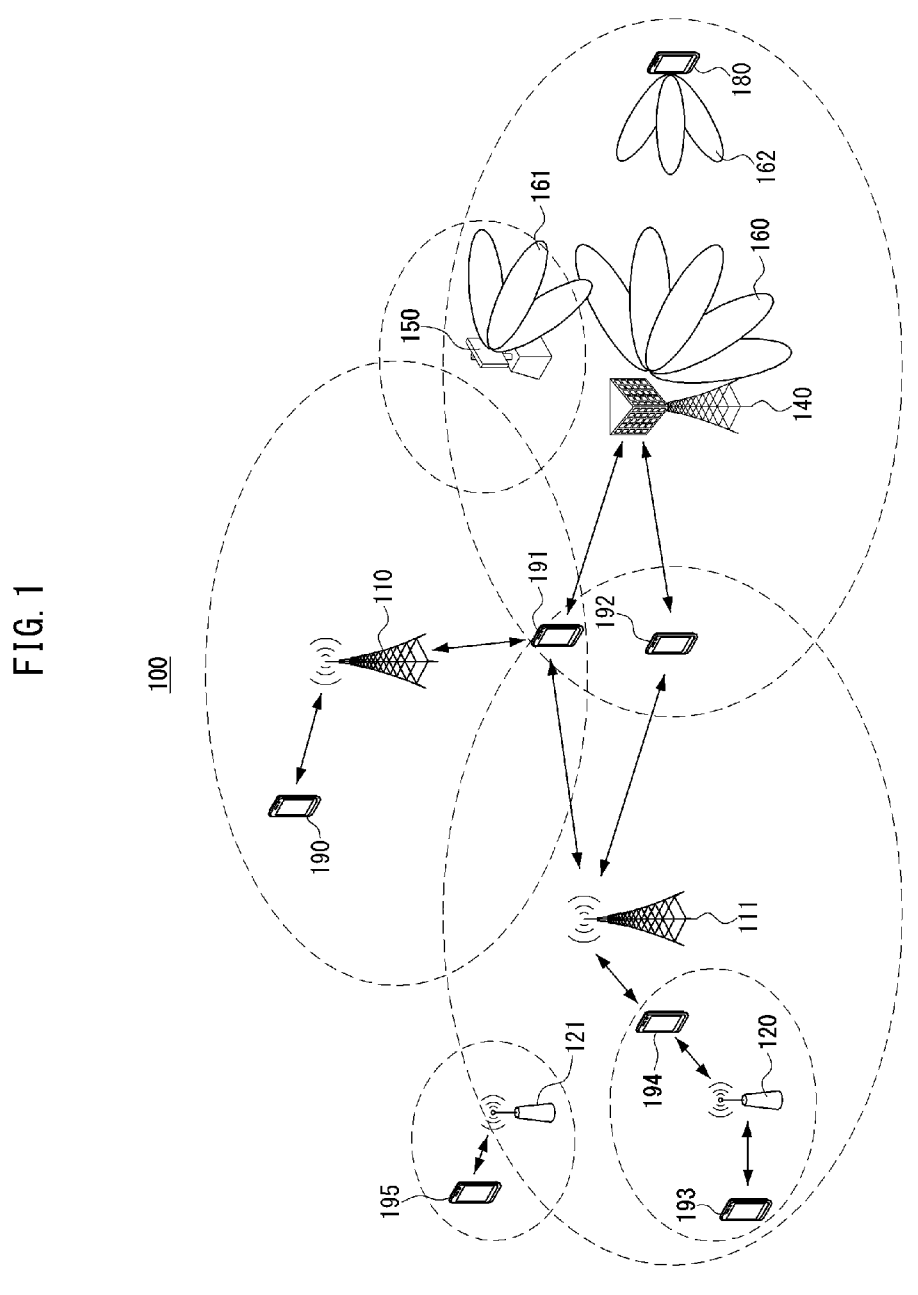
FIG. 1 is a conceptual diagram illustrating an exemplary embodiment of a mobile communication network to which exemplary embodiments of the present invention are applied.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

In a mobile communication system, a base station connected to a network can provide a radio connection to a terminal moving within a predetermined coverage. The terminal can be bidirectionally connected to the network through a process of bidirectionally exchanging data with the connected base station. The moving terminal can maintain connection with the network by changing a connected base station in a handover scheme. The base station may play a role of proactively managing resources within a coverage providing a connection to the terminal. The terminal managed by the base station can exchange data with the base station through a process of transmitting and receiving radio signals using allocated resources.

The base station may be configured variously according to the size of its coverage providing connectivity. Base stations providing various coverages may be overlapped and provide radio accesses to terminals. In general, the size of the coverage provided by the base station depends on a frequency, and decreases as the frequency increases. A plurality of transmission and reception points (TRPs) are devices that transmit and receive radio signals to and from a terminal, constitute a part of the base station, and may constitute the base station at the same location or distributed locations. The base station may be configured in a centralized manner for radio access functions or in a distributed manner for the functions. The base station whose radio access functions are distributed may be configured with a central unit (CU) providing upper functions and at least one distributed unit (DU) providing lower functions.

The terminal may transmit and receive radio signals with cell(s) provided by the base station in a radio section, and transmit and receive data using a hierarchical radio access protocol that performs radio access functions. A service packet generated in a service layer may be delivered to a counterpart through the radio access protocol. The base station may distribute the radio access protocol to distributed devices in functional units, and may be configured as a set of the distributed devices. The radio access function provided by the radio access protocol generally uses a single frequency band, and may be performed in a bandwidth part (BWP) within the frequency band. A method of using multiple frequency bands may be classified into carrier aggregation (CA) and dual connectivity (DC) according to a configuration scheme of the radio access protocol.

Meanwhile, a sidelink may be configured between terminals in a mobile communication environment. Communication using a sidelink may be performed through a procedure of discovering a neighboring terminal, a procedure of configuring the sidelink with the neighboring terminal, and a procedure of transmitting resource information and data by using sidelink resources in the configured sidelink. The sidelink provides direct communication between adjacent terminals, and functions included in a mobile communication network, such as a sidelink server, may perform a procedure of controlling and configuring the sidelink.

1.1. Wireless Communication Network

A wireless communication network to which exemplary embodiments according to the present disclosure are applied will be described. A wireless communication network to which exemplary embodiments according to the present disclosure are applied is not limited to the contents described below, and exemplary embodiments according to the present disclosure may be applied to various wireless communication networks. Here, the wireless communication network may be used as the same meaning as a wireless communication system.

FIG. 1 is a conceptual diagram illustrating an exemplary embodiment of a mobile communication network to which exemplary embodiments of the present invention are applied.

Referring to FIG. 1, a mobile communication network 100 may comprise a plurality of communication nodes 110, 111, 120, 121, 140, 150, 180, 190, 191, 192, 193, 194, and 195. Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a space division multiple access (SDMA) based communication protocol, or the like.

The mobile communication network 100 may comprise a plurality of base stations (BSs) 110, 111, 120, 121, 140, and 150, and a plurality of terminals (user equipments (UEs)) 190, 191, 192, 193, 194, 195, and 180. Each of the plurality of base stations 110, 111, and 140 may form a macro cell. Alternatively, each of the plurality of base stations 120, 121, and 150 may form a small cell. The plurality of base station 190 and 191 may belong to a cell coverage of the base station 110. The plurality of base stations 120 and 121 and the plurality of terminals 191, 192, 193, 194, and 195 may belong to a cell coverage of the base station 111. The base station 150 and the plurality of terminals 191, 192, and 180 may belong to a cell coverage of the base station 140.

Each of the plurality of communication nodes 110, 111, 120, 121, 140, 150, 180, 190, 191, 192, 193, 194, and 195 may support a radio access protocol specification of a radio access technology based on cellular communication (e.g., long term evolution (LTE), LTE-Advanced (LTE-A), new radio (NR), etc. which are defined in the 3rd generation partnership project (3GPP) standard). Each of the plurality of base stations 110, 111, 120, 121, 140, and 150 may operate in a different frequency band, or may operate in the same frequency band. The plurality of base stations 110, 111, 120, 121, 140, and 150 may be connected to each other through an ideal backhaul or a non-ideal backhaul, and may exchange information with each other through the ideal backhaul or the non-ideal backhaul. Each of the plurality of base stations 110, 111, 120, 121, 140, and 150 may be connected to a core network (not shown) through a backhaul. Each of the plurality of base stations 110, 111, 120, 121, 140, and 150 may transmit data received from the core network to the corresponding terminals 190, 191, 192, 193, 194, 195, and 180, and transmit data received from the corresponding terminals 190, 191, 192, 193, 194, 195, and 180 to the core network.

Each of the plurality of communication nodes 110, 111, 120, 121, 140, 150, 180, 190, 191, 192, 193, 194, and 195 constituting the mobile communication network 100 may exchange signals with a counterpart communication node without interferences by using a beam formed through a beamforming function using multiple antennas.

Each of the plurality of base stations 110, 111, 120, 121, 140, and 150 may support multiple input multiple output (MIMO) transmissions using multiple antennas (e.g., single user (SU)-MIMO, multi user (MU)-MIMO, massive MIMO, etc.), coordinated multipoint (CoMP) transmission, carrier aggregation (CA) transmission, unlicensed band transmission, device-to-device (D2D) communication, proximity services (ProSe), dual connectivity transmission, and the like.

Each of the plurality of base stations 110, 111, 120, 121, 140, and 150 may be referred to as a NodeB, evolved NodeB, gNB, ng-eNB, radio base station, access point, access node, node, radio side unit (RSU), or the like. Each of the plurality of terminals 190, 191, 192, 193, 194, 195, and 180 may be referred to as a user equipment (UE), terminal, access terminal, mobile terminal, station, subscriber station, mobile station, portable subscriber station, node, device, Internet of Things (IoT) device, mounted apparatus (e.g., mounted module/device/terminal or on-board device/terminal, etc.), or the like. The content of the present invention is not limited to the above-mentioned terms, and they may be replaced with other terms that perform the corresponding functions according to a radio access protocol according to a radio access technology (RAT) and a functional configuration supporting the same.

1.2. Communication Node

Figure 2:
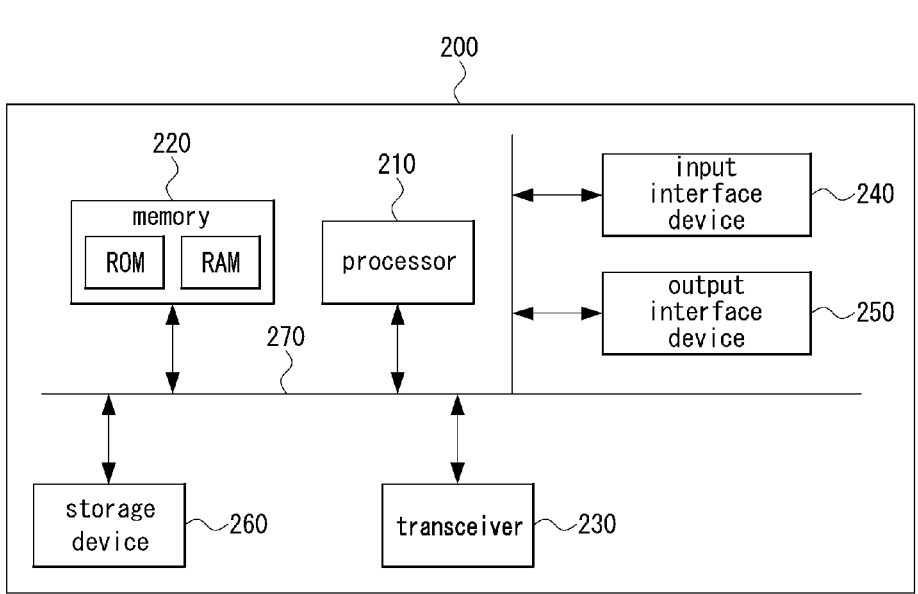
FIG. 2 is a block diagram illustrating an exemplary embodiment of a communication node constituting a mobile communication network.

FIG. 2 is a block diagram illustrating an exemplary embodiment of a communication node constituting a mobile communication network.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with exemplary embodiments of the present invention are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Each of the plurality of communication nodes 110, 111, 120, 121, 140, 150, 180, 190, 191, 192, 193, 194, and 195 constituting the mobile communication network 100 may be implemented in the form of the communication node 200.

1.3. Radio Access Protocol

The radio access protocol may provide functions in which a plurality of communication nodes exchange data and control information by using radio resources in a radio section, and may be hierarchically configured. In the cellular communication (e.g., long term evolution (LTE), LTE-Advanced (LTE-A), new radio (NR), etc. which are the 3rd generation partnership project (3GPP) standards), the radio access protocol may be composed of a radio layer 1 (RL1) which configures physical signals, a radio layer 2 (RL2) which controls radio transmissions in radio resources shared by a plurality of communication nodes, transmits data to a counterpart node, and converges data from the counterpart node, and a radio layer 3 (RL3) which performs radio resource managements such as network information sharing, radio connection management, mobility management, and quality of service (QoS) management for multiple communication nodes participating in the mobile network.

The radio layer 1 may be a physical layer and may provide functions for data transfer. The radio layer 2 may include sublayers such as a medium access control (MAC), a radio link control (RLC), a packet data convergence protocol (PDCP), a service data adaptation protocol (SDAP), and the like. The radio layer 3 may be a radio resource control (RRC) layer, and may provide an AS layer control function.

1.4. Sidelink and Relay Terminal

Meanwhile, a sidelink may be a radio connection for transmitting data between terminals. Transmission of the data may be performed in such a manner that a terminal receives a radio signal transmitted by a counterpart terminal. A method in which transmitting and receiving terminals use the same resource at the same time in an environment where a plurality of terminals use the same radio frequency may be used. The transmitting terminal may provide resource information to the receiving terminal.

A sidelink function in mobile communication may be configured with an interface between the terminals and an interface between at least one terminal and a sidelink server. Here, the sidelink server may provide information related to sidelink communication to the terminal. A base station may be included in a communication path between the sidelink server and the terminal, and may mutually deliver packets exchanged between the terminal and the sidelink server. In the 3GPP radio access, the sidelink may include a PC5 interface between the terminals, and may include a PC3 interface between the terminal and the sidelink server.

A terminal that is a subject of sidelink transmission/reception may transmit/receive data for discovering neighboring terminals. The procedure for discovering neighboring terminals may be required prior to configuring a sidelink consisting of a pair of adjacent terminals. The sidelink server may collect information on neighboring terminals and may have the information on neighboring terminals with respect to a specific terminal.

The transmitting terminal may exchange request/report messages with the sidelink server that stores information on the discovered terminals. The sidelink server may request a transmitting terminal to transmit a discovery message. Accordingly, the transmitting terminal may receive the transmission request of a discovery message from the sidelink server. Then, the transmitting terminal may transmit a discovery message to neighboring terminals. As a result, a neighboring terminal may receive the discovery message and may transmit a discovery response message to the transmitting terminal in response thereto. The transmitting terminal may receive the discovery response message from the neighboring terminal, thereby identifying the neighboring terminal. Thereafter, the transmitting terminal may report response information included in the received discovery response message to the sidelink server. As another discovery method, the transmitting terminal may request neighboring terminals to transmit a discovery message. Accordingly, a neighboring terminal may receive the transmission request of a discovery message, and may transmit a discovery message to the transmitting terminal in response thereto. The transmitting terminal may receive the discovery message from the neighboring terminal, thereby identifying the neighboring terminal.

The transmitting terminal of the sidelink may transmit control information for allocation of a resource to be used to the receiving terminal. In this case, the base station may allocate the resource to be used by the transmitting terminal. In this case, the transmitting terminal may request resource configuration from the base station. Then, the base station may select a resource, and allocate the resource to the transmitting terminal by transmitting resource allocation information to the transmitting terminal. The transmitting terminal may transmit control information including information on the resource and information on data to the receiving terminal by using the allocated resource. The receiving terminal may identify the allocated resource from the received control information, and may receive the data by using the identified resource. In this manner, the transmitting and receiving terminals may exchange data through the sidelink. Alternatively, the transmitting terminal may autonomously allocate the resource to be used by the transmitting terminal. This scheme may be a scheme in which the transmitting terminal arbitrarily selects the resource to be used for transmission and reception. After selecting the resource, the transmitting terminal may exchange data with the receiving terminal through the sidelink by using the selected resource.

In the sidelink, radio resources may be operated on a channel basis according to a usage. Physical channels of the sidelink may include at least one of a physical sidelink broadcast channel (PSBCH) for transmitting broadcast information through the sidelink, a physical sidelink control channel (PSCCH) for transmitting sidelink control information, a physical sidelink shared channel (PSSCH) for transmitting data, and a physical sidelink feedback channel (PSFCH) transmitted by a receiving side for received data. As synchronization signals in the sidelink, at least one of a sidelink primary synchronization signal (S-PSS), a sidelink secondary synchronization signal (S-SSS), and a channel state information reference signal (CSI-RS) for sidelink channel measurement may be used.

The receiving terminal receiving the data transmitted by the transmitting terminal through the sidelink may inform the transmitting terminal of whether the data has been received. A PSFCH for transmitting whether the data has been received may be used by one terminal or shared and used by a plurality of terminals. In a one-to-one transmission scheme where one transmitting terminal and one receiving terminal configure a sidelink, the receiving terminal may use the PSFCH. In a one-to-many transmission scheme where one transmitting terminal and a plurality of receiving terminals configure a sidelink, the plurality of receiving terminals may share the PSFCH. Here, the sharing scheme may include a scheme of transmitting the PSFCH in case of acknowledgement (ACK) and a scheme of transmitting the PSFCH in case of negative ACK (NACK or non-ACK).

A relay terminal (i.e., relay UE) may relay data between a network and a remote terminal (i.e., remote UE). The relay terminal may access the remote terminal through a sidelink, and may exchange data with the remote terminal by using the sidelink. The relay terminal may access the base station by using a Uu interface, and may exchange data with the network by using the Uu interface. The remote terminal may exchange data with the network via the relay terminal. The remote terminal may access the sidelink. The remote terminal may be located within a coverage of the base station. Alternatively, the remote terminal may be located outside the coverage of the base station.

Figure 3:
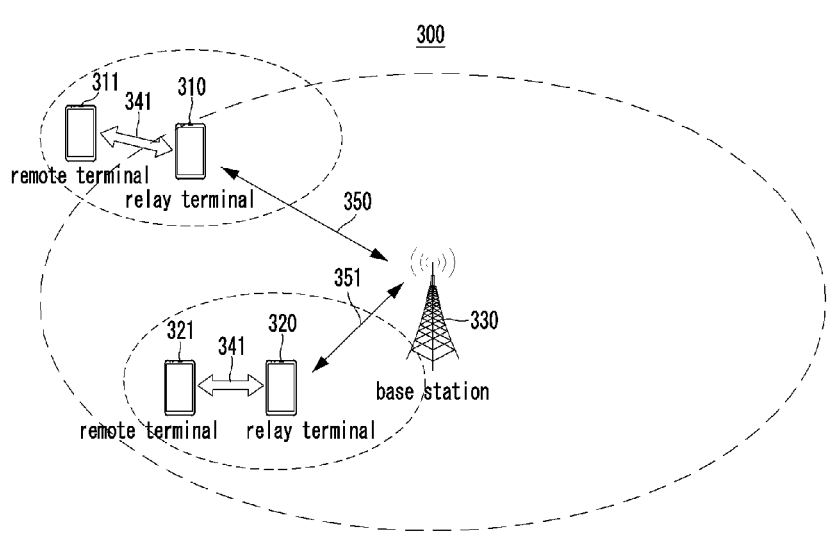
FIG. 3 is a conceptual diagram illustrating a first exemplary embodiment of a data relaying method of a relay terminal.

FIG. 3 is a conceptual diagram illustrating a first exemplary embodiment of a data relaying method of a relay terminal.

Referring to FIG. 3, a first remote terminal 311 may be connected to a network by accessing a first sidelink 340. A first relay terminal 310 may be connected to the first sidelink 340 and perform a function of relaying data using a first Uu interface 350. In addition, a second remote terminal 321 may be connected to the network by accessing a second sidelink 341. A second relay terminal 320 may be connected to the second sidelink 341 and perform a function of relaying data using a second Uu interface 351. The first and second relay terminals 310 and 320 may be located in a coverage provided by a base station 330. Also, the first remote terminal 311 may be located within the coverage provided by the base station 330. Unlike the first remote terminal 311, the second remote terminal 321 may be located outside the coverage. As described above, a method for managing sidelink resources is required in order for the relay terminal connected through a Uu interface and a sidelink interface between the base station and the remote terminal to configure an adaptation layer and transmit data.

Hereinafter, operation methods of communication nodes in a mobile communication network according to exemplary embodiments of the present disclosure will be described. Even when a method (e.g., transmission or reception of a signal) performed at a first communication node among communication nodes is described, the corresponding second communication node may perform a method (e.g., reception or transmission of the signal) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

2. Adaptation Layer PDU Processing 2.1. Relay Adaptation Layer

A relay terminal may be located between a remote terminal and a base station to perform a function of relaying signals/data between them. The remote terminal and the relay terminal may be connected through a PC5 interface, and the relay terminal and the base station may be connected through a Uu interface.

Figure 4:
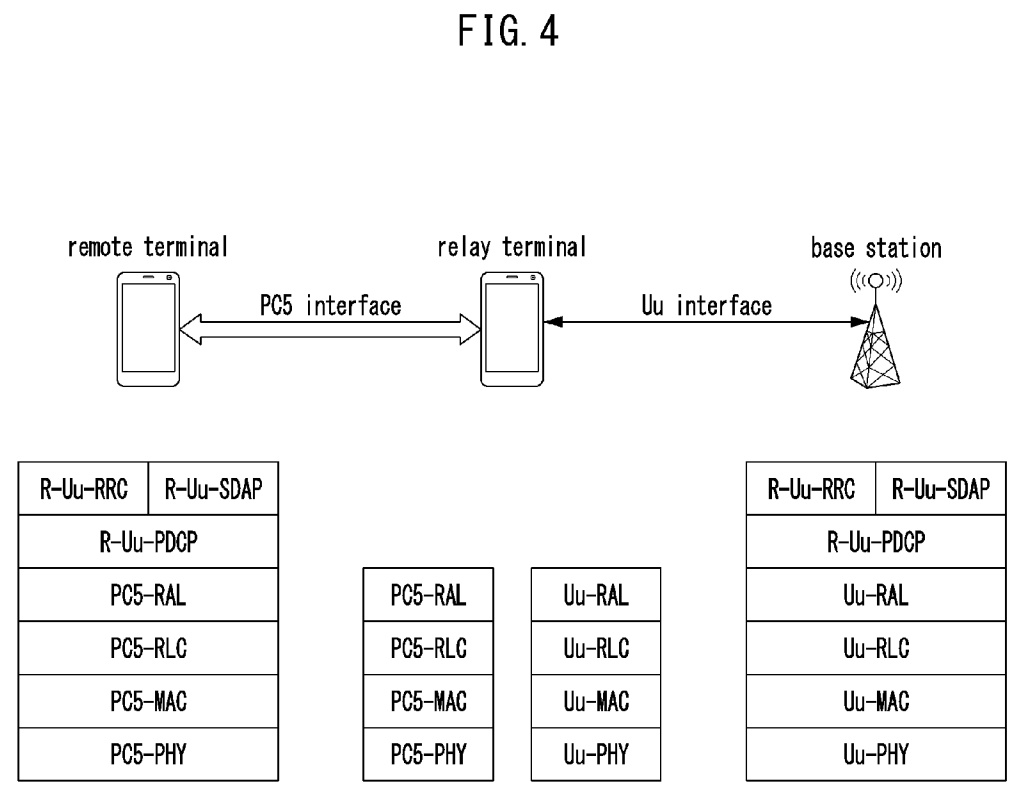

FIG. 4 is a conceptual diagram for describing a protocol configuration for each interface in an environment including a remote terminal, a relay terminal, and a base station.

For UE-to-Network (U2N) relaying, a PC5 relay adaptation layer (PC5-RAL) and a Uu relay adaptation layer (Uu-RAL) may be configured for the PC5 interface and the Uu interface, respectively. In the U2N relaying, a remote terminal and a base station may configure an R-Uu-packet data convergence protocol (PDCP) layer, R-Uu-radio resource control (RRC) layer, and R-Uu-service data adaptation protocol (SDAP) layer for the PC5 interface and the Uu interface, respectively. Specifically, in the remote terminal, R-Uu-RRC, R-Uu-PDCP, and PC5-RAL layers may be configured in a control plane for signaling, and R-Uu-SDAP, R-Uu-PDCP, and PC5-RAL layers may be configured in a user plane for data transmission. In the base station, R-Uu-RRC, R-Uu-PDCP, and Uu-RAL layers may be configured in a control plane for signaling, and R-Uu-SDAP, R-Uu-PDCP, and Uu-RAL layers may be configured in a user plane for data transmission.

The adaptation layer (RAL) may be located above a radio link control (RLC) layer, the PC5-RAL layer may be configured for the PC5 interface, and the Uu-RAL layer may be configured for the Uu interface. In the remote terminal, the PC5-RAL layer may be located between the R-Uu-PDCP layer and the PC-5 RLC layer, thereby configuring the R-Uu-PDCP layer for the PC5 interface. In the base station, the Uu-RAL layer may be located between the R-Uu-PDCP layer and the Uu-RLC layer, thereby configuring the R-Uu-PDCP layer for the Uu interface. In general, a connection identifier (or end-to-end (E2E) bearer identifier) and a remote terminal identifier may be used in the RAL layer. The connection identifier (e.g., E2E bearer ID) may be used to identify a connection (e.g., E2E bearer) established between the remote terminal and the base station. The connection identifier may be uniquely configured within the remote terminal or uniquely configured within the base station. The remote terminal identifier may be uniquely configured within the network or uniquely configured within the base station.

The connection (e.g., E2E bearer) established between the base station and the remote terminal may be identified using at least the corresponding connection identifier in the adaptation layer. Since the connection identifier can be uniquely configured within the remote terminal, the connection established between the base station and the remote terminal may be uniquely identified within the remote terminal by using the connection identifier. The connection established between the base station and the remote terminal may be uniquely identified within the base station by using the remote terminal identifier and the connection identifier. The remote terminal identifier may be a local remote terminal identifier (e.g., local remote UE ID) that is unique within the network where the remote terminal operates or is temporarily assigned and identified within the base station to which the remote terminal and/or the relay terminal is connected.

2.2. Interface-to-Connection Mapping

The RAL layer may utilize the connection identifier (e.g., E2E bearer ID) and the local remote terminal identifier (e.g., local remote UE ID), and may perform mapping between an interface and a Uu RLC channel or PC5 RLC channel by using them.

Figure 5:
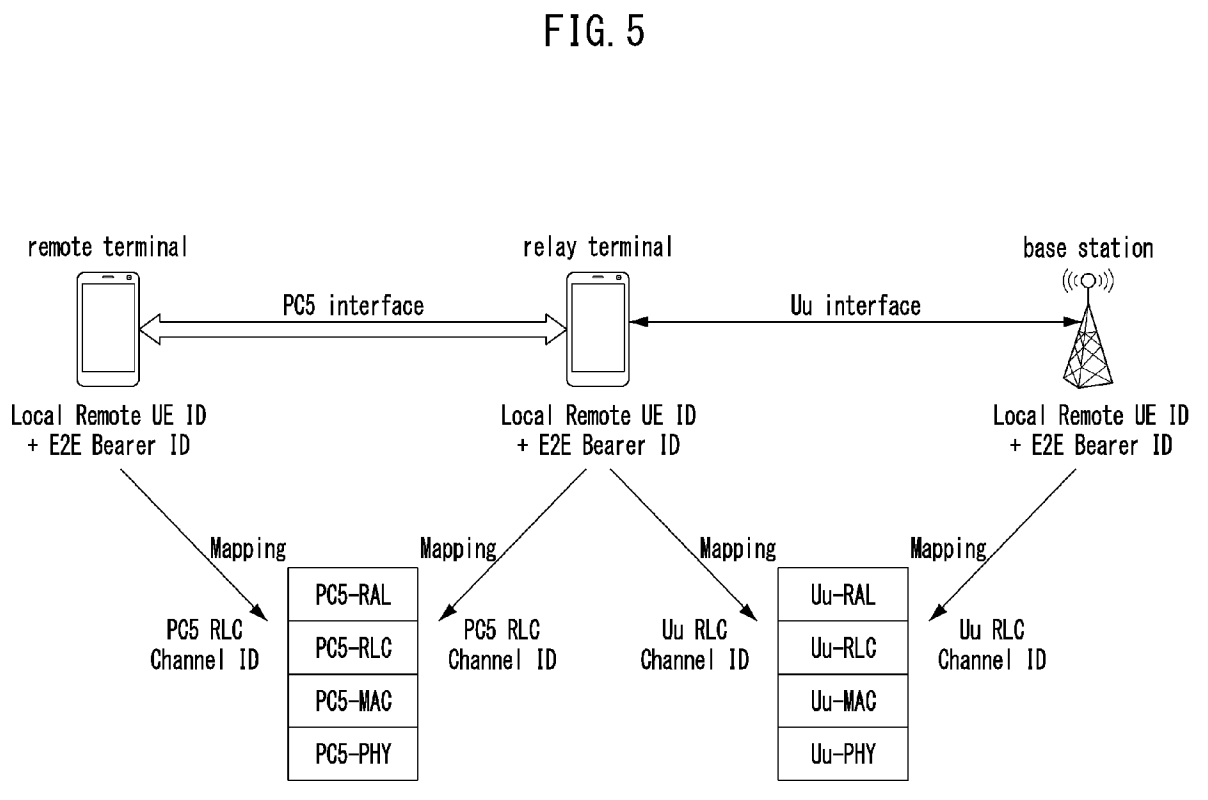

FIG. 5 is a conceptual diagram illustrating mapping between a connection identifier, which is used in a remote terminal, a relay terminal, and a base station, and a PC5 RLC channel ID or Uu RLC channel ID.

(Connection mapping in the base station, Downlink (DL)) In the base station, a connection (e.g., E2E bearer) established for the remote terminal may be mapped to an RLC channel of the Uu-RLC layer. One connection or a plurality of connections established for the remote terminal may be mapped to the RLC channel. A protocol data unit (PDU) header configured in the Uu-RAL layer may include the local remote terminal ID (e.g., local remote UE ID) and the connection identifier (e.g., E2E bearer ID). Data transmitted through resource allocation for each RLC channel may have the same QoS characteristics.

(Connection mapping in the relay terminal, DL) The relay terminal may identify the remote terminal using the local remote terminal identifier (i.e., local remote UE ID) in the Uu-RAL layer, and may map an L2 identifier (hereinafter, PC5 L2 identifier) for identifying the remote terminal to the PC5 interface corresponding to the remote terminal. The relay terminal may map a PC5 RLC channel to the connection identifier.

Meanwhile, a plurality of PC5 L2 identifiers for identifying the remote terminal in the PC5 interface may be configured to the remote terminal. The relay terminal may map the PC5 L2 identifier corresponding to the local remote terminal identifier and the connection identifier used in the Uu-RAL to the PC5 RLC channel. In the remote terminal having a plurality of PC5 L2 identifiers, a specific PC5 L2 identifier may be identified using the local remote terminal identifier and the connection identifier used in the Uu-RAL. The QoS may be configured for each PC5 RLC channel corresponding to the PC5 L2 identifier.

(Connection mapping in the remote terminal, uplink (UL)) The remote terminal may map the connection identifier to the PC5 RLC channel. When one PC5 L2 identifier is configured in the remote terminal, the corresponding PC5 L2 identifier may be mapped to the PC5 RLC channel. When a plurality of PC5 L2 identifiers are configured in the remote terminal, the remote terminal may map the PC5 L2 identifier and the PC5 RLC channel to the connection identifier.

(Connection mapping in the relay terminal, UL) The relay terminal may map the Uu RLC channel to the connection identifier and the identified remote terminal (i.e., local remote UE ID). When a plurality of PC5 L2 identifiers are configured in the remote terminal, the remote terminal may be identified using the PC5 L2 identifier.

(DL/UL mapping example, single PC5 L2 identifier) Mapping in the DL direction may performed by the base station and the relay terminal, and mapping in the UL direction may be performed by the remote terminal and the relay terminal.

2.3. Use of Identifiers in the Adaptation Layer

As described above, information required for the adaptation layer to configure a relay path and for the relay terminal to relay packets includes the connection identifier and the local remote terminal identifier. These identifiers may or may not be included in a header of a PDU of the PC5-RAL depending on conditions operating on the Uu interface and the PC5 interface. Specifically, both, one, or none of the two identifiers may be included in a header of the PC5-RAL PDU based on one of the following three scheme. In the first scheme (Scheme 1), both the connection identifier and the local remote terminal identifier may be included in the header of the PC5-RAL PDU. In the second scheme (Scheme 2), the connection identifier may be included in the header of the PC5-RAL PDU and the local remote terminal identifier may not be included in the header of the PC5-RAL PDU. In the third scheme (Scheme 3), none of the connection identifier and the local remote terminal identifier may be included in the header of the PC5-RAL PDU.

(Scheme 1) The PC5-RAL and the Uu-RAL may have the connection identifier and the local remote terminal identifier. The header of the PC5-RAL PDU may include the connection identifier and the local remote terminal identifier. In the DL direction, the base station may configure a Uu-RAL PDU by including the connection identifier and the local remote terminal identifier in a RAL PDU header in the Uu-RAL. The relay terminal may configure a PC5-RAL PDU by including the connection identifier and the local remote terminal identifier received in the Uu-RAL in a PC5-RAL PDU header at the PC5-RAL. In this case, the relay terminal may configure the PC5-RAL PDU header by referring to header information of the Uu-RAL PDU. When the RAL PDU headers have the same configuration, the relay terminal may operate in a manner of forwarding the Uu-RAL PDU as the PC5-RAL PDU. The above-described case of FIG. 5 may correspond to Scheme 1 using both the connection identifier and the local remote terminal identifier in both the Uu-RAL and the PC5-RAL.

(Scheme 2) In the PC5-RAL, a PC5-RAL PDU header including only the connection identifier may be configured. If the remote terminal has one PC5 L2 identifier, the PC5-RAL may be configured for each remote terminal unlike the Uu-RAL. Accordingly, the local remote terminal identifier for identifying the remote terminal in the PC5-RAL may be configured to have a feature of being associated with the PC5 L2 identifier. In the DL direction, the relay terminal may perform a function of mapping the local remote terminal identifier to the PC5 L2 identifier. In the UL direction, the relay terminal may identify the local remote terminal identifier mapped to the PC5 L2 identifier.

Figure 6:
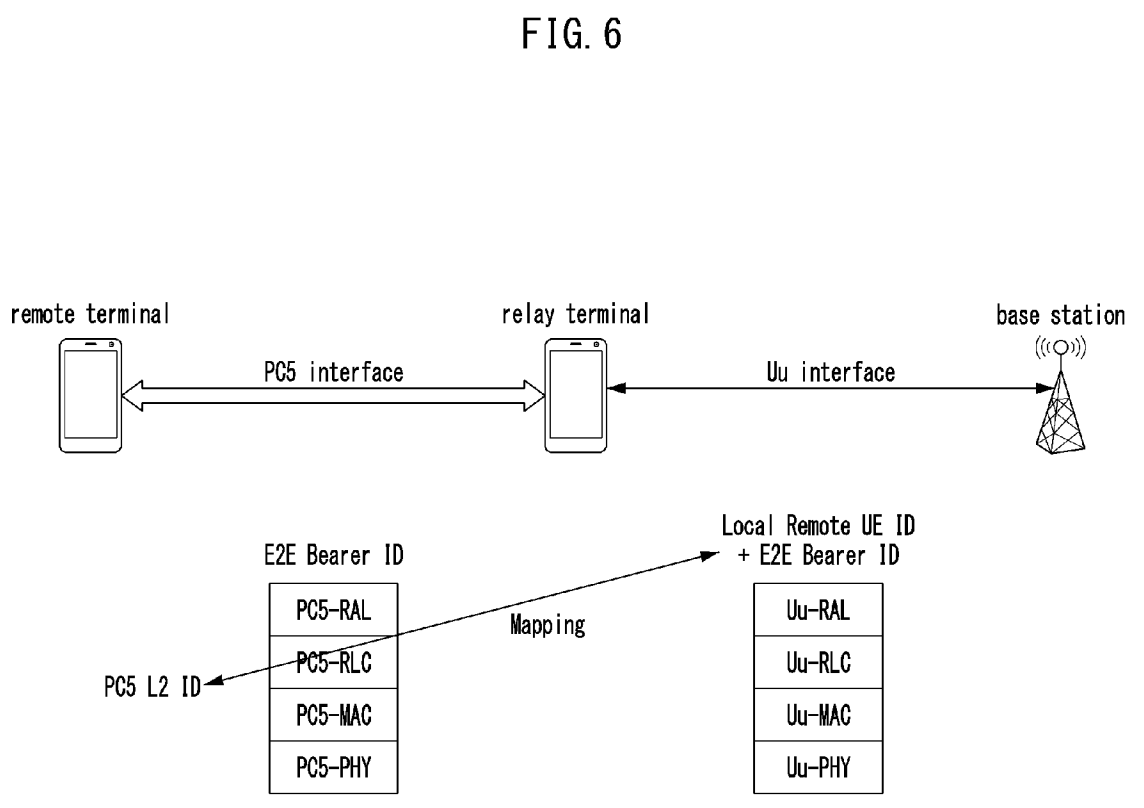

FIG. 6 is a conceptual diagram for describing a method of including a connection identifier in a RAL PDU header in the PC5-RAL.

A local remote terminal identifier (e.g., local remote UE ID) used in the Uu-RAL may be mapped with the PC5 L2 identifier used in sidelink for sidelink communication. The relay terminal may identify the local remote terminal identifier in the DL direction, perform a function of mapping the identified local remote terminal identifier to the PC5 L2 identifier of the remote terminal. In addition, the relay terminal may identify the local remote terminal identifier from the PC5 L2 identifier of the remote terminal in the UL direction, and use the local remote terminal identifier in a Uu-RAL PDU header. The connection identifier may be used equally in the Uu-RAL and the PC5-RAL.

(Scheme 3) In the PC5-RAL, the connection identifier and local remote terminal identifier may not be used. In this case, the remote terminal may map the connection identifier for each PC5 RLC channel using one PC5 L2 identifier. Signaling for mapping one connection identifier for each PC5 RLC channel in the PC5 interface may be performed between the base station and the remote terminal or between remote terminals. In the DL direction, the relay terminal may obtain the local remote terminal identifier included in a Uu-RAL PDU header, identify the PC5 L2 identifier of the mapped remote terminal, and transmit the received packet to the corresponding remote terminal. The relay terminal may identify the PC5 RLC channel mapped to the connection identifier and transmit the received packet through the PC5 interface. In the UL direction, the remote terminal may select a PC5 RLC channel corresponding to a QoS of a packet to be transmitted, and transmit the packet to the relay terminal through the PC5 interface. In a reception process, the relay terminal may obtain the local remote terminal identifier corresponding to the PC5 L2 identifier of the remote terminal, which is obtained in the PC5-MAC layer. As a method for the remote terminal to identify the connection identifier, a method of identifying the PC5 RLC channel corresponding to the logical channel of the PC5-MAC layer and identifying the connection identifier using the identified PC5 RL channel, or a method of identifying the connection identifier corresponding to the logical channel of the PC5-MAC layer may be used.

The relay terminal may apply a different method of configuring the identifier(s) according to the relay connection between the base station and the remote terminal. The relay terminal may apply Scheme 1 to the Uu interface and the PC5 interface. In this case, the Uu-RAL PDU header may include the connection identifier and the local remote terminal identifier, and the PC-RAL PDU header may include the connection identifier and the local remote terminal identifier. The used connection identifier and the local remote terminal identifier may be configured identically.

The relay terminal may apply Scheme 1 to the Uu interface and Scheme 3 to the PC5 interface. In this case, the Uu-RAL PDU header may include the connection identifier and the local remote terminal identifier, and the PC5-RAL PDU header may not include the connection identifier and the local remote terminal identifier. In a downlink direction, the relay terminal may identify the connection identifier and the local remote terminal identifier in a received Uu-RAL PDU header, and may select a PC5-RLC channel mapped to these identifiers. The relay terminal may transmit the configured PC5-RAL PDU to the remote terminal through the selected PC5-RLC channel. In an uplink direction, the remote terminal may identify the connection identifier and the local remote terminal identifier mapped to a PC5-RLC channel through which a received PC5-RAL PDU is transmitted, and may configure a Uu-RAL PDU header including the identified connection identifier and the local remote terminal identifier.

2.4. Multi-Hop Sidelink (Multi-hop sidelink) A multi-hop sidelink in which two or more relay terminals configure a relay path with two or more PC5 interfaces may be configured. For convenience of description, it is assumed that an identification number is assigned starting from a relay terminal close to a base station. That is, referring to FIG. 7 to be described later, a relay terminal 1 may be connected to the base station through a Uu interface, and a last relay terminal 2 may be connected to a remote terminal through a PC5 interface. A PC5 interface may be configured between the relay terminals. The relay terminal may configure connections with a plurality of remote terminals. The relay terminal may configure relay links hierarchically or horizontally. A relay terminal configuring hierarchical relay links may configure a relay link with one relay terminal in the direction of the base station and configure relay links with a plurality of relay terminals in the direction of the remote terminal(s). A relay terminal configuring horizontal relay links may configure relay links with a plurality of relay terminals in all directions. That is, the relay terminal configuring horizontal relay links may configure relay links with a plurality of relay terminals in the direction of the base station.

(Configuration per PC5-RAL layer) In the multi-hop sidelink configuration, a PC5-RAL layer may be configured for each PC5 interface. The three PC5-RAL PDU header configuration schemes described above may be applied for each PC5 interface. For example, Scheme 1 may be applied to a first PC5 interface and Scheme 2 may be applied to a second PC5 interface. When identifier(s) included in a PC5-RAL PDU header configured in each PC5 interface are determined, operations for connection identifier mapping and local remote terminal identifier mapping may be performed using the determined identifier(s). For example, Scheme 1 may be applied to the first PC5 interface and Scheme 1 may be applied to the second PC5 interface. For example, Scheme 3 may be applied to the first PC5 interface and Scheme 3 may be applied to the second PC5 interface. For example, Scheme 1 may be applied to the first PC5 interface and Scheme 3 may be applied to the second PC5 interface.

(Same identifier configuration for PC5-RALs) The same identifier configuration may be applied to the PC5-RALs of all PC5 interfaces in the multi-hop sidelink.

Figure 7:
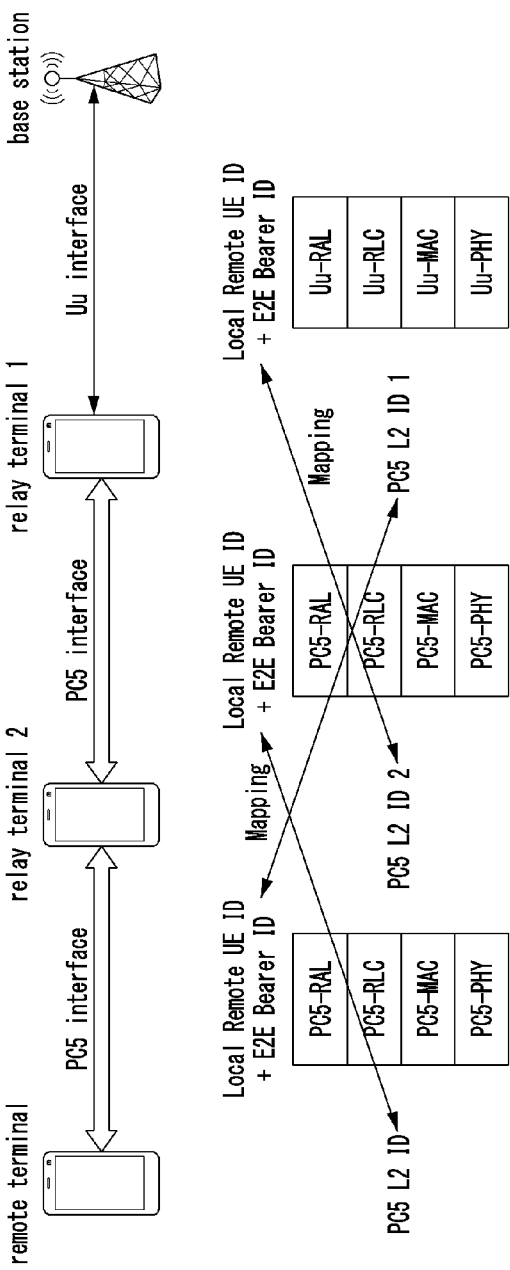
FIG. 7 is a conceptual diagram for describing a case in which the same identifier configuration is applied to PC5-RALs of PC5 interfaces in a multi-hop sidelink.

FIG. 7 is a conceptual diagram for describing a case in which the same identifier configuration is applied to PC5-RALs of PC5 interfaces in a multi-hop sidelink.

The case illustrated in FIG. 7 may correspond to a multi-hop sidelink configured with two PC5 interfaces. Even in the case of multi-hop sidelink, the same identifier configuration and the same RAL PDU header configuration may be applied to the PC5-RAL of each PC5 interface. The relay terminals may identify the PC5 RLC channel and/or the PC5 L2 identifier using the connection identifier and the local remote terminal identifier identified through the RAL PDU header.

(Different identifier configurations for PC5-RALs) Different identifier configurations may be applied to PC5-RALs of PC5 interfaces in a multi-hop sidelink.

Figure 8:
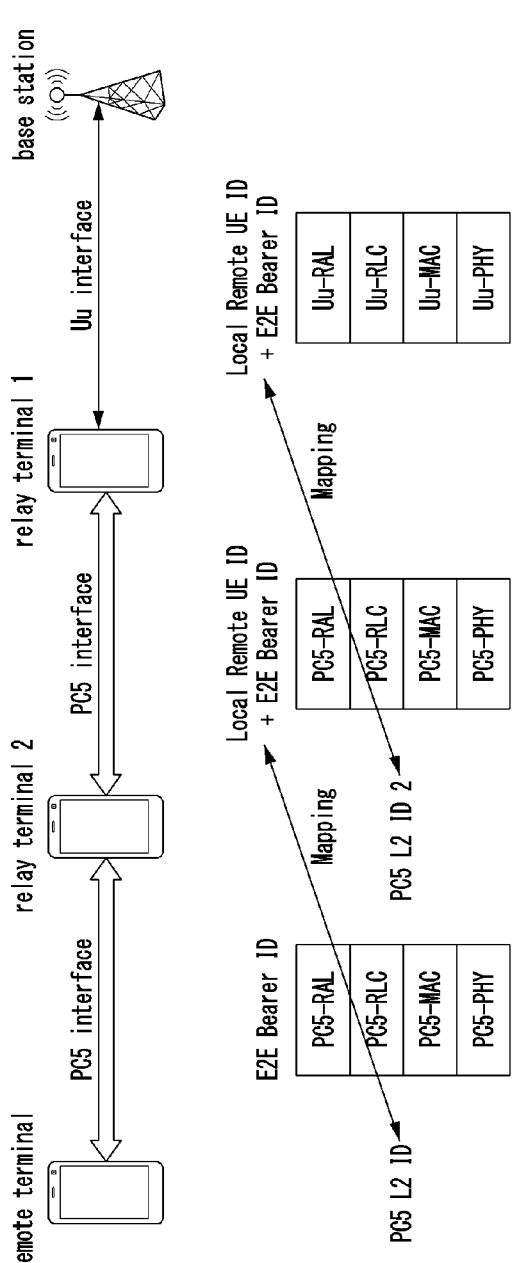
FIG. 8 is a conceptual diagram for describing a case in which different identifier configurations are applied to PC5-RALs of PC5 interfaces in a multi-hop sidelink.

FIG. 8 is a conceptual diagram for describing a case in which different identifier configurations are applied to PC5-RALs of PC5 interfaces in a multi-hop sidelink.

Referring to FIG. 8, a PC5-RAL PDU header including the connection identifier may be applied between the remote terminal and the relay terminal 2, and a PC5-RAL PDU header including the connection identifier and the local remote terminal identifier may be applied between the relay terminal 2 and the relay terminal 1.

The remote terminal and the relay terminal 2 may be connected through a PC5 interface to which the remote terminal is connected. In an environment in which one PC5 L2 identifier is configured in the remote terminal, the configuration in which the PC5-RAL uses the connection identifier may be applied.

2.5. RAL PDU Header Configuration (Fixed header) A fixed RAL PDU header configuration may be used. In general, if a PDU header has a fixed configuration according to the technical specification, fields of the PDU header may always exist in fixed positions. That is, the RAL PDU header may include the connection identifier and the local remote terminal identifier in fixed positions. In operations of the RAL, the connection identifier and the local remote terminal identifier may always be included in the RAL PDU header.

(Configurable Header) In a process of activating a RAL, a method of informing the terminal for which the RAL is configured of a configuration of a header to be used in the RAL may be used. In a procedure of configuring or changing a RAL, whether or not the RAL PDU header includes the connection identifier and/or the local remote terminal identifier may be indicated to the terminal. For example, through a RAL configuration procedure, the terminal may be configured to use a RAL PDU header using both the connection identifier and the local remote terminal identifier. For example, through a procedure for changing RAL configuration, the terminal may be configured to use a RAL PDU header using only the local remote terminal identifier. Since two terminals existing on both ends of a sidelink using the configured RALs recognize the configuration of the RAL PDU header, they can transmit and receive RAL PDUs including the corresponding RAL PDU header.

(Variable header—notifier) The RAL PDU header may include field(s) (e.g., notifier(s)) indicating whether the header includes the connection identifier and/or the local remote terminal identifier. For example, a header including a connection identifier field notifier indicating whether a connection identifier field exists and a local remote terminal identifier field notifier indicating whether a local remote terminal identifier field exists may be used. For example, if the local remote terminal identifier field notifier is set, the local remote terminal identifier field may be included in the header. Alternatively, one notifier may be configured to notify presence or absence of both the connection identifier and the local remote terminal identifier field. When the variable RAL PDU header including the aforementioned notifier(s) is used, an independent RAL PDU header configuration for each interface may be applied. For example, in the PC5 interface, the RAL PDU header including only the connection identifier may be used by setting the connection identifier field notifier in the RAL PDU header, and in the Uu interface, the RAL PDU header including both the connection identifier and the regional remote terminal identifier may be used by setting the connection identifier field notifier and the local remote terminal identifier field notifier in the RAL PDU header.

(Variable header—header type) Instead of using the aforementioned notifier(s), a header type may be used to indicate whether the RAL PDU header includes the connection identifier and/or the local remote terminal identifier. For example, a header type 1 may indicate a RAL PDU header including both the connection identifier and the local remote terminal identifier, a header type 2 may indicate a RAL PDU header including only the connection identifier, and a header type 3 may indicate a RAL PDU header including none of the connection identifier and the local remote terminal identifier. A transmitting terminal may determine a header type for indicating a configuration of a RAL PDU header, generate a field indicating the determined header type, and transmit a RAL PDU including generated fields to a receiving terminal. The receiving terminal may identify the header type according to a received RAL PDU and interpret the fields of the RAL PDU according to the identified header type. The header type of the RAL PDU header may be configured differently for each interface. That is, the above-described header format may be independently applied for each interface. For example, a RAL PDU header type including only the connection identifier may be configured for a PC5 interface, and a RAL PDU header type including the connection identifier and the local remote terminal identifier may be configured on a Uu interface. For example, a header type indicating a RAL PDU header including only the connection identifier may be used in the PC5 interface, and a header type indicating a RAL PDU header including both the connection identifier and the local remote terminal identifier may be used in the Uu interface.

2.6. Identifier Assignment

A local remote terminal identifier used by a relay terminal included in a relay path in a RAL may be assigned by a base station. After the local remote terminal identifier is assigned to the RAL, the relay path for data transmission may be activated, and the relay terminal may relay data transmitted and received between the remote terminal and the base station through the relay path. To this end, a signaling procedure for configuring the local remote terminal identifier to the relay terminal may be required.

(Activation of RAL) When a local remote terminal identifier is used in the RAL, a procedure for assigning the local remote terminal identifier to the RAL may be performed first before utilizing the RAL. After the local remote terminal identifier is assigned, the local remote terminal identifier may be used in packets transmitted and received by the RAL.

Figure 9:
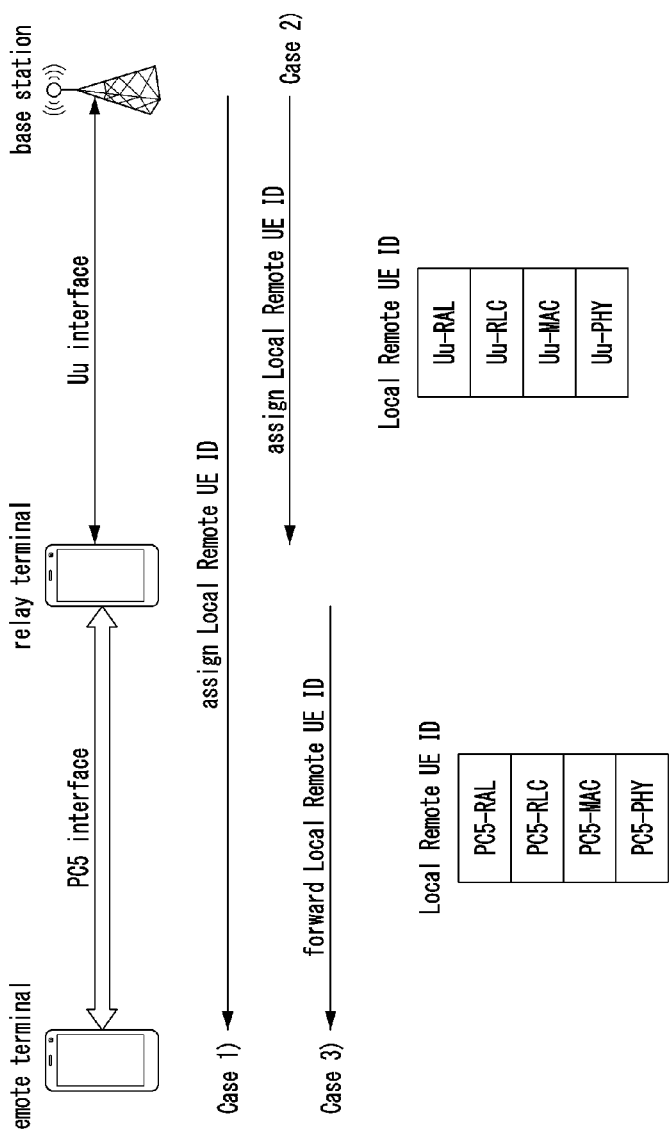
FIG. 9 is a conceptual diagram for describing a procedure for assigning a local remote terminal identifier to a PC5-RAL or Uu-RAL.

FIG. 9 is a conceptual diagram for describing a procedure for assigning a local remote terminal identifier to a PC5-RAL or Uu-RAL.

The base station may assign a local remote terminal identifier to the remote terminal using a packet relayed through the Uu interface and the PC5 interface (Case 1 in FIG. 9). Alternatively, the base station may assign a local remote terminal identifier to the relay terminal using a signaling procedure of the Uu interface (Case 2 in FIG. 9), and the relay terminal may assign the local remote terminal identifier of the remote terminal, which is configured by the base station, to the remote terminal using a packet delivered through the PC5 interface (Case 3 in FIG. 9).

3. Relay Connection Establishment (Relay Connection) A relay connection refers to a connection (i.e., E2E bearer) established between the base station and the remote terminal, and may be identified by the above-described connection identifier (i.e., E2E bearer ID). A packet transmitted through the relay connection may be transmitted and received between the base station and the remote terminal through a forwarding function of the relay terminal.

Figure 10:
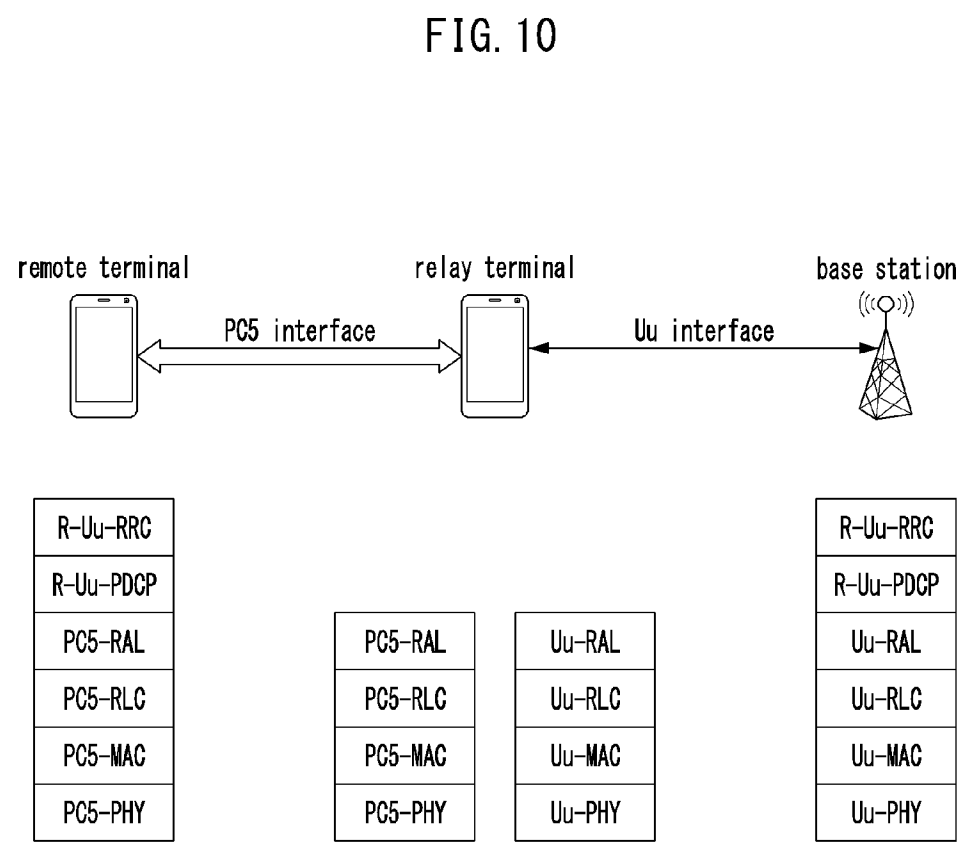

FIG. 10 is a conceptual diagram illustrating a protocol configuration of a relay connection for signaling message transmission.

The R-Uu-RRC/R-Uu-PDCP layers corresponding to each other may be configured in the remote terminal and the base station, and the relay terminal may configure protocols for relaying in the PC5 interface and the Uu interface, respectively.

(R-SRB and R-DRB) A relay connection that transmits a signaling message may be referred to as a relay signaling radio bearer (R-SRB), and a relay connection that transmits a data packet may be referred to as a relay data radio bearer (R-DRB). FIG. 10 shows a protocol configuration configured in a control plane applied to the R-SRB. Specifically, an R-SRB0 is a relay connection for delivering a signaling message for establishing relay connections for signaling such as R-SRB1/R-SRB2/R-SRB3. The R-SRB0 corresponds to a relay connection that delivers a message corresponding to a common signaling procedure, and R-SRBs other than the R-SRB0 correspond to relay connections that deliver messages corresponding to a dedicated signaling procedure delivered to a corresponding relay terminal. R-DRBs may be configured by a signaling message transmitted through the R-SRB.

3.1. R-SRB0 Configuration According to Pre-Activation Scheme (RAL layer utilization) The remote terminal may utilize the RAL layer in a process of transmitting a signaling message through the R-SRB0. That is, the RAL layer may be configured and utilized before a logical remote terminal identifier is assigned. In this case, as a method of identifying the remote terminal, the remote terminal may generate a random remote terminal identifier (i.e., random remote UE ID), and the generated random remote terminal identifier may be used instead of the local remote terminal identifier. The random remote terminal identifier may assigned by a transmitting side, and the assigned remote terminal identifier may be used in the RAL PDU header. That is, the remote terminal (i.e., transmitting terminal) may transmit the RAL PDU including the RAL PDU header including the assigned random remote terminal identifier to the receiving terminal (i.e., remote terminal). The transmitting side may check whether the same random remote terminal identifier is included in a signaling message (i.e., a RAL PDU header of the signaling message) received as a response from the receiving side.

Figure 11:
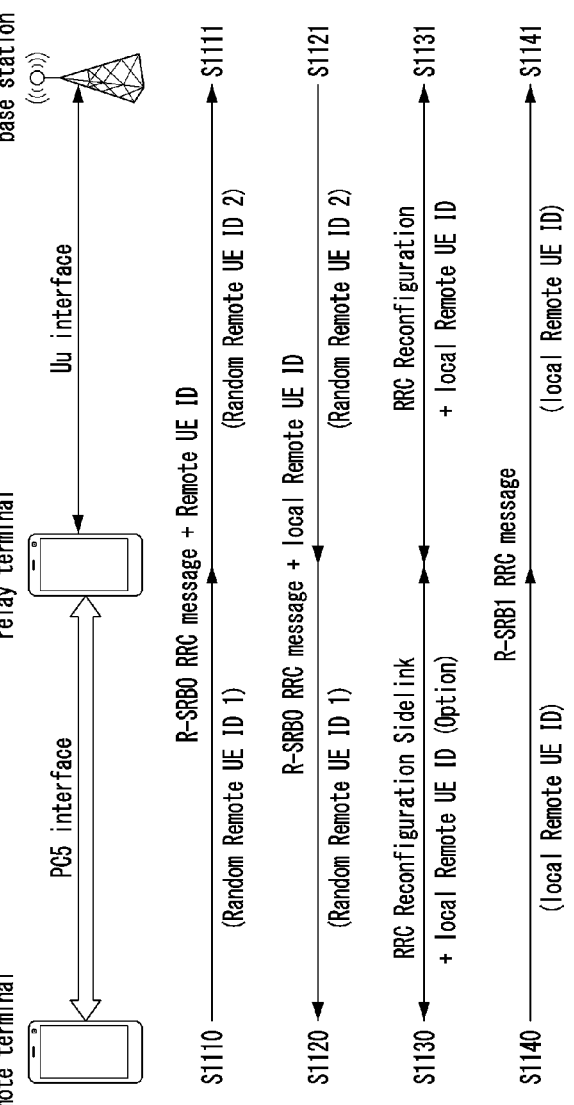
FIG. 11 is a conceptual diagram illustrating a method in which each of a remote terminal and a relay terminal generates a random remote terminal identifier and utilize it in a RAL layer according to an exemplary embodiment of the present disclosure.

FIG. 11 is a conceptual diagram illustrating a method in which each of a remote terminal and a relay terminal generates a random remote terminal identifier and utilize it in a RAL layer according to an exemplary embodiment of the present disclosure.

Referring to FIG. 11, a remote terminal may generate a random remote terminal identifier (i.e., random remote UE ID 1) and use it for transmission (S1110), and a relay terminal also may generate a random remote terminal identifier (i.e., random remote UE ID 2), and use it for transmission (S1111). In response thereto, the relay terminal and a base station each may transmit a response signaling message using the corresponding random terminal identifier (S1120 and S1121), and the remote terminal and the relay terminal may respectively receive them. R-SRB0 RRC messages in the steps S1110 and S111 may be transmitted between the remote terminal and the base station through relaying of the relay terminal, and may include a remote terminal identifier (i.e., remote UE ID).

(Direct delivery of a local remote UE ID) The base station may directly transmit the local remote terminal identifier to the remote terminal by including the local remote terminal identifier in the R-SRB0 RRC message used in the steps S1121 and S1120.

(Relay delivery of a local remote terminal identifier) The local remote terminal identifier may be assigned by the base station, and delivered to the relay terminal and the remote terminal, respectively. The base station may deliver the assigned local remote terminal identifier to the relay terminal through an RRC reconfiguration signaling procedure of the Uu interface (S1131). Thereafter, the relay terminal may deliver the local remote terminal identifier received from the base station to the remote terminal through an RRC reconfiguration sidelink signaling procedure (i.e., sidelink RRC reconfiguration procedure) of the PC5 interface (S1130). The base station may deliver the local remote terminal identifier to the relay terminal in the signaling procedure of step S1131, and the relay terminal may deliver the local remote terminal identifier to the remote terminal in the signaling procedure of step S1130. The remote terminal and the relay terminal acquiring the regional remote terminal identifier may respectively utilize it. That is, after acquiring the local remote terminal identifier, communication between the remote terminal and the relay terminal may be performed using the local remote terminal identifier.

(Separate operations of PC5 and Uu Interfaces) Although FIG. 11 describes the procedure in which the PC5 interface and the Uu interface operate in associated with each other, the PC5 interface and the Uu interface may operate independently from each other. For example, in the step S1111, which can be performed independently of the step S1110, the relay terminal may generate and transmit a random identifier (i.e., random remote UE ID 2) in the process of transmitting the R-SRB0 RRC message to the base station. That is, the process in which the relay terminal transmits the R-SRB0 RRC message to the base station may not be related to the process in which the relay terminal receives the R-SRB0 RRC message from the remote terminal. For example, unlike in the step S1110, the relay terminal may receive the R-SRB0 RRC message in a manner of not using the random remote UE ID, and then, as in the step S1111, the relay terminal may deliver the R-SRB0 RRC message to the base station.

3.2. R-SRB0 Configuration According to Pre-Allocation Scheme

As a requirement to establishing a connection carrying the R-SRB0, the adaptation layer requires the local remote terminal identifier. Accordingly, a R-SRB0 signaling message may be transmitted after a procedure for assigning the local remote terminal identifier is performed.

Figure 12:
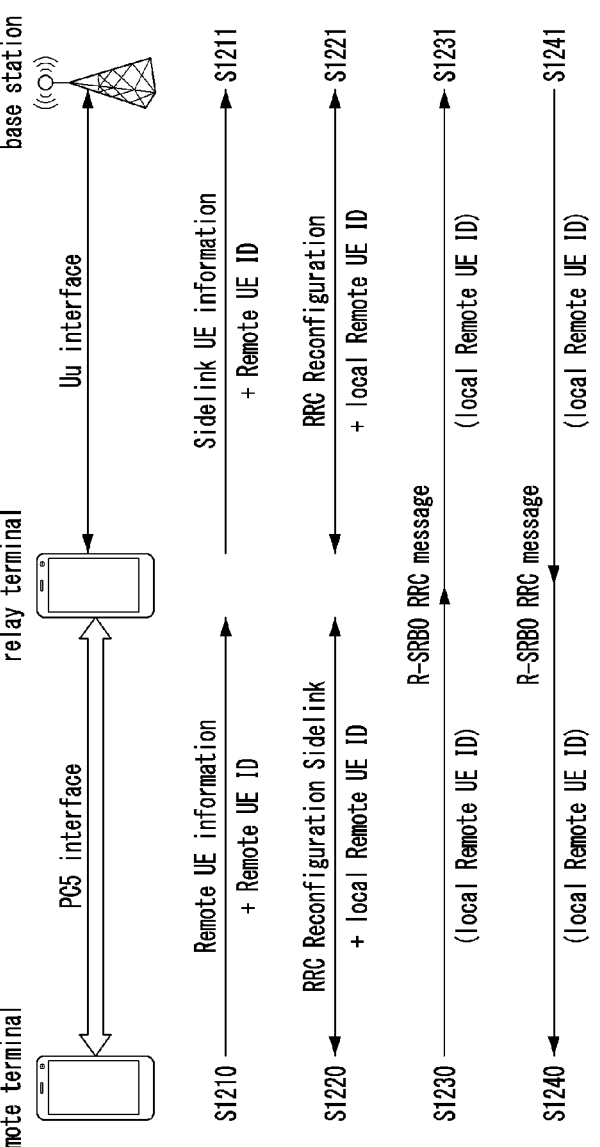
FIG. 12 is a conceptual diagram illustrating a procedure of exchanging R-SRB signaling messages by first assigning a local remote terminal identifier before activating a RAL layer and then utilizing the activated RAL layer.

FIG. 12 is a conceptual diagram illustrating a procedure of exchanging R-SRB signaling messages by first assigning a local remote terminal identifier before activating a RAL layer and then utilizing the activated RAL layer.

(local remote terminal identifier assignment) A transmitting terminal (e.g., remote terminal or relay terminal) may transmit a signaling message including a terminal identifier to request assignment of a local remote terminal identifier, and in response thereto, a terminal (e.g., relay terminal or base station) receiving the signaling message may exchange a signaling message including a local remote terminal identifier with the transmitting terminal (e.g., remote terminal) or the relay terminal. This procedure may be applied independently in each of the PC5 interface and the Uu interface. In the PC5 interface and the Uu interface, the local remote terminal identifier may be requested by transmitting terminal information (i.e., UE information) including the remote terminal identifier to the counterpart. Thereafter, the base station may deliver the local remote terminal identifier allocated by the base station to the relay terminal, and the relay terminal may deliver it to the remote terminal, so that the local remote terminal identifier is delivered to the remote terminal. The RAL layer using the local remote terminal identifier may exchange R-SRB signaling messages between the remote terminal and the base station. In particular, an RRC signaling message transmitted through the R-SRB0 may be exchanged as the first message, and the relay terminal may deliver it using the RAL layer.

Referring to FIG. 12, in the Uu interface, the relay terminal may transmit a signaling message (e.g., sidelink UE Information) including the remote terminal identifier to the base station to request assignment of the local remote terminal identifier (S1211). The base station may transmit the assigned regional remote terminal identifier to the relay terminal through a signaling procedure (e.g., RRC reconfiguration procedure) (S1221).

In the PC5 interface, the remote terminal may transmit a signaling message (e.g., remote UE information) including the identifier of the remote terminal to the relay terminal, and request assignment of the local remote terminal identifier (S1210). The relay terminal may transmit the local remote terminal identifier provided by the base station to the remote terminal through a signaling procedure (e.g., RRC reconfiguration sidelink procedure) (S1220). The procedure for assigning the remote terminal identifier may be performed in a manner in which signaling procedures of the PC5 interface and the Uu interface interwork or in a method in which signaling procedures of the PC5 interface and the Uu interface are performed independently.

(R-SRB signaling message delivery) After the local remote terminal identifier is configured, the RAL layer may be activated, R-SRB signaling messages may be exchanged between the remote terminal and the base station, and the relay terminal may relay them (S1230, S1231, S1240, S1241).

(Applicable to Uu interface only) The above-described R-SRB0 configuration procedure of the pre-allocation scheme may be applied only to the Uu interface. In the PC5 interface, R-SRB0 connection establishment that does not use the local remote terminal identifier may be utilized. In the signaling procedure for configuring a sidelink on the PC5 interface, the R-SRB0 may activate the protocol with fixed parameters.

Figure 13:
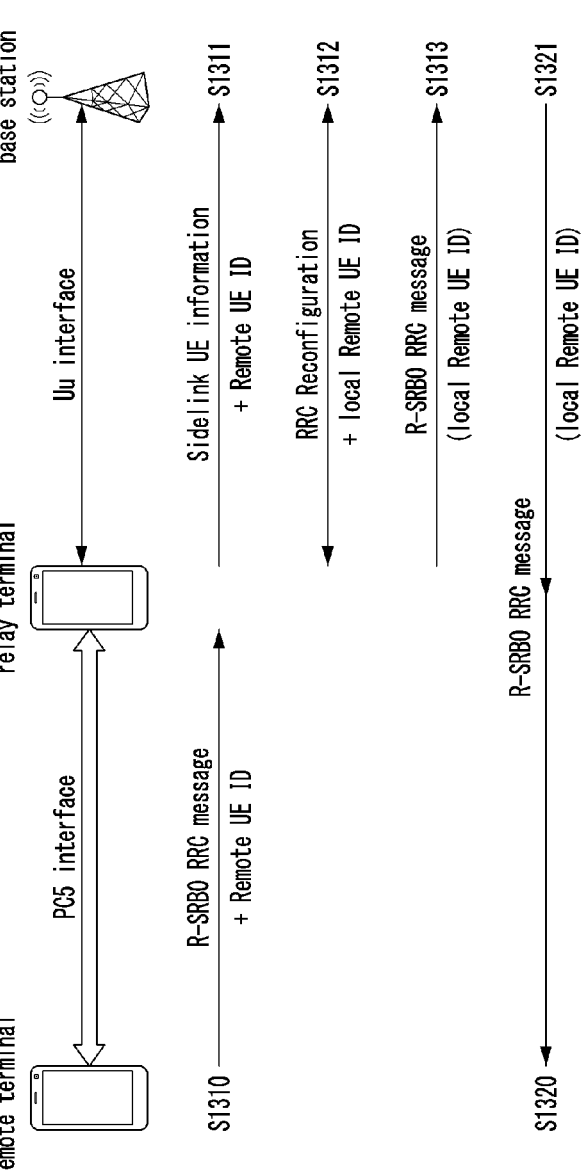
FIG. 13 is a conceptual diagram for describing a method of performing an R-SRB0 configuration procedure in a pre-assignment scheme in a Uu interface, and utilizing a connection established in a PC5 interface.

FIG. 13 is a conceptual diagram for describing a method of performing an R-SRB0 configuration procedure in a pre-assignment scheme in a Uu interface, and utilizing a connection established in a PC5 interface.

The remote terminal may deliver the R-SRB0 RRC message and the remote terminal identifier to the relay terminal through an established connection (S1310). The remote terminal identifier may be delivered as being included in the R-SRB0 RRC message, or may be transmitted through a separate field. The relay terminal may identify the remote terminal identifier in the received message or identify the remote terminal identifier from the received PC5 L2 identifier. The relay terminal may perform the R-SRB0 configuration procedure of the pre-assignment scheme applied to the Uu interface (S1310, S1312), and deliver the R-SRB0 RRC message to the base station using the identified local remote terminal identifier (S1313). The base station may deliver the R-SRB0 RRC message as a response to the remote terminal via the relay terminal (S1321, S1320).

3.3. R-SRB0 According to Relay Information Transfer Scheme

A method of transmitting and receiving an R-SRB0 signaling message may be applied in the PC5 RRC protocol and the Uu RRC protocol, respectively, without using the RAL layer. For example, a relay information transfer sidelink signaling message may be defined as a PC5 RRC message and may be used to exchange an R-SRB0 message between the remote terminal and the relay terminal. In addition, a relay information transfer signaling message may be defined as a Uu RRC message and may be used to exchange an R-SRB0 message between the relay terminal and the base station.

Figure 14:
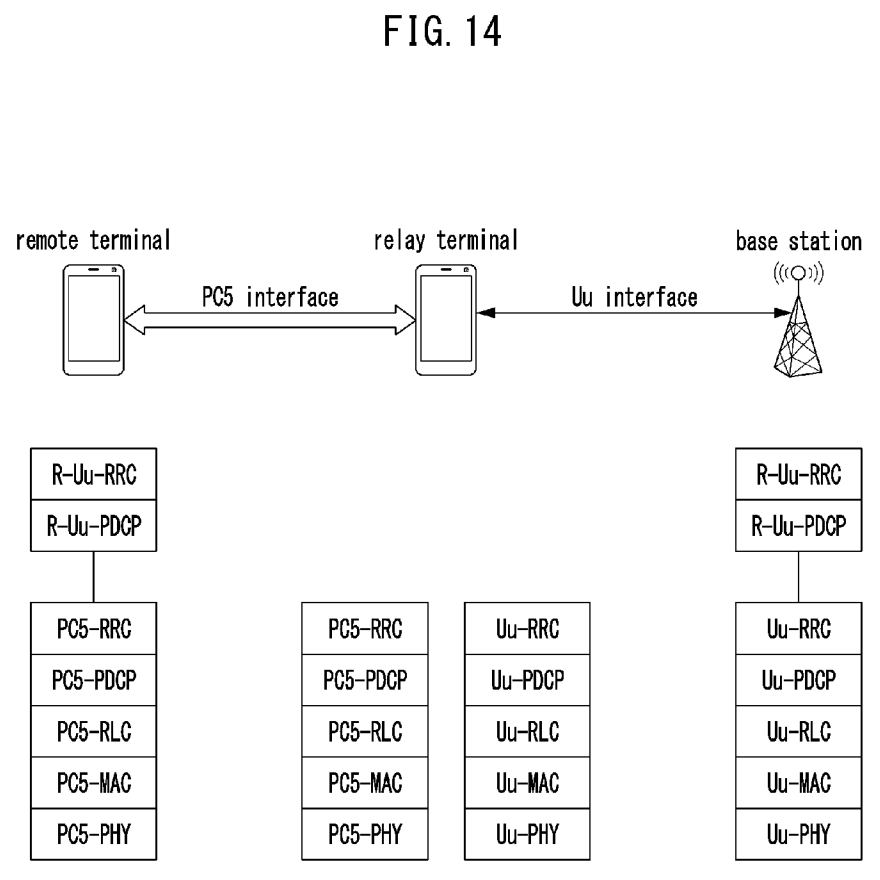
Figure 15:
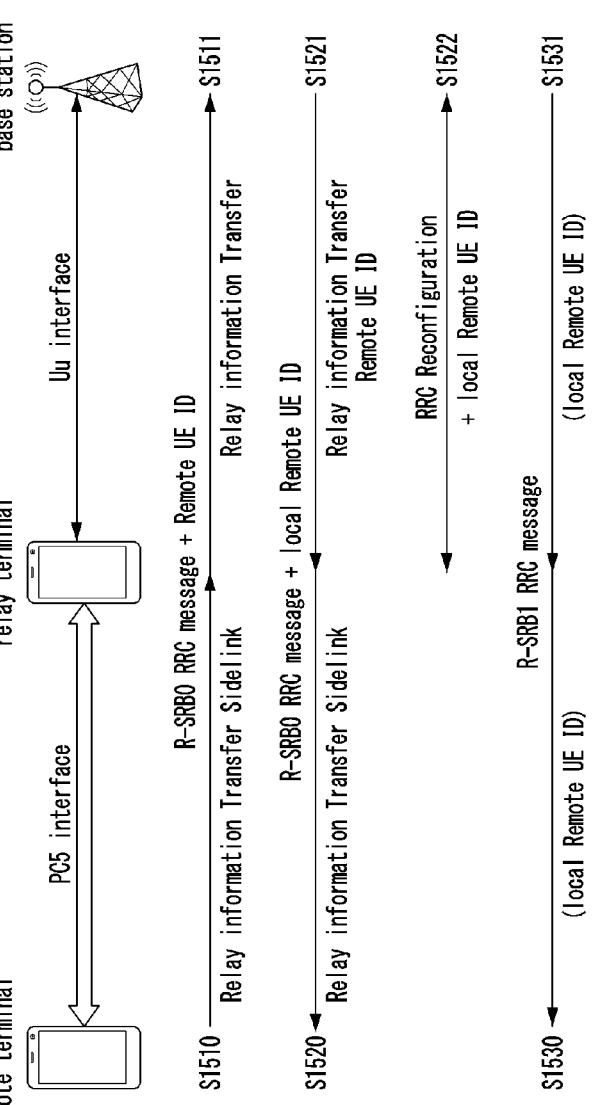
FIG. 15 is a diagram illustrating for describing a signaling procedure in which an R-SRB0 message transmitted as a PC5 RRC message in a PC5 interface, and transmitted as a Uu RRC message in a Uu interface.

FIG. 14 is a conceptual diagram for describing a protocol structure configured for exchanging an R-SRB0 signaling message between a remote terminal and a base station without using a RAL layer, and FIG. 15 is a diagram illustrating for describing a signaling procedure in which an R-SRB0 message transmitted as a PC5 RRC message in a PC5 interface, and transmitted as a Uu RRC message in a Uu interface.

(R-SRB0 transmission protocol structure) The remote terminal may generate an R-SRB0 signaling message in the R-Uu-RRC layer, and transmit the generated R-SRB0 signaling message to the relay terminal by using a relay information transfer sidelink signaling message defined in the PC5-RRC layer via the R-Uu-PDCP layer (S1510). The relay terminal may transmit information included in the relay information transfer sidelink signaling message received in the PC5-RRC layer to the base station by including it in a relay information transfer sidelink signaling message in the Uu-RRC layer (S1511). The base station may identify the R-SRB0 signaling message in the R-Uu-RRC layer via the R-Uu-PDCP layer for the content received in the Uu-RRC layer. An R-SRB0 signaling message transmitted from the base station to the remote terminal may be transmitted by the base station, and received by the remote terminal in a similar manner (S1521 and S1520).

(Remote terminal ID may be included) The remote terminal identifier may be included in the relay information transfer sidelink signaling message defined in the PC5 interface and the relay information transfer signaling message defined in the Uu interface. The remote terminal identifier may be used to determine a connection path or a response target by identifying the remote terminal in each interface. For example, a relay terminal to which a plurality of remote terminals are connected may indicate a target remote terminal by transmitting a signaling message including the remote terminal identifier through the Uu interface. On the other hand, if there is no need to identify a remote terminal in each interface, each signaling message may not include the remote terminal identifier.

(Signaling message configuration example) Referring to FIG. 15, the remote terminal identifier may be included in the R-SRB0 RRC signaling messages transmitted in the steps S1510 and S1511, and the local remote terminal identifier may be included in the R-SRB0 signaling message that is a response thereto (S1521, S1520). For example, the relay information transfer message of the step S1521 may include the remote terminal identifier, and the relay terminal may identify the remote terminal identifier to identify the remote terminal, and transmit the relay information transfer sidelink signaling message of the step S1520 to the corresponding remote terminal through the PC5 interface.

Operations such as a start, stop, reset, restart, or expire of a timer defined in relation to an operation of the timer defined or described in the present disclosure may mean or include the operation of the timer or a counter for the corresponding timer without being separately described.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a first terminal for establishing a relay connection, the operation method comprising:
    generating a PC5-relay adaptation layer (PC5-RAL) protocol data unit (PDU) header for the first terminal, the PC5-RAL PDU header including or not including a remote terminal identifier and a connection identifier;
    mapping the generated PC5-RAL PDU header to a PC5-radio link control (RLC) channel; and
    generating a PC5-RAL PDU by adding data to the PC5-RAL PDU header, and transmitting the generated PC5-RAL PDU to a corresponding second terminal through the PC5-RLC channel,
    wherein the first terminal is a remote terminal, and the second terminal is a relay terminal,
    wherein a first PC5-RAL is located above a PC5-RLC layer of the first terminal, and a second PC5-RAL is located above a PC5-RLC layer of the second terminal,
    wherein the first terminal configures, for a relay-Uu-radio resource control (R-Uu-RRC) message which is a signaling message, the PC5-RAL PDU using the PC5-RAL PDU header not including the remote terminal identifier and the connection identifier, or configures the PC5-RAL PDU using the PC5-RAL PDU header including the remote terminal identifier and the connection identifier, and
    wherein the first terminal configures, for a relay-Uu-service data adaptation protocol (R-Uu-SDAP) message for transferring user data, the PC5-RAL PDU by using the PC5-RAL PDU header including the remote terminal identifier and the connection identifier.

2. The operation method according to claim 1, wherein the remote terminal identifier is a local remote terminal identifier determined by a base station and delivered to the first terminal or the second terminal.

3. The operation method according to claim 1, wherein the first terminal determines the PC5-RLC channel mapped to the remote terminal identifier and the connection identifier, or the first terminal determines the PC5-RLC channel mapped to the connection identifier.

4. The operation method according to claim 1, wherein the first terminal determines a PC5-layer 2 (L2) identifier mapped to the remote terminal identifier.

5. The operation method according to claim 1, further comprising activating the first PC5-RAL in the first terminal or the second PC5-RAL in the second terminal, wherein the remote terminal identifier and the connection identifier are configured in the activating of the first PC5-RAL or the second PC5-RAL.

6. An operation method of a relay terminal for establishing a relay connection, the operation method comprising:

identifying a remote terminal identifier and a connection identifier in a first relay adaptation layer (RAL);

generating, in a second RAL, an RAL protocol data unit (PDU) header including or not including the remote terminal identifier and the connection identifier;

mapping the generated RAL PDU header to a radio link control (RLC) channel; and adding data to the RAL PDU header of the second RAL to generate an RAL PDU of the second RAL, and transmitting the generated RAL PDU to a corresponding communication node through the RLC channel, wherein the first RAL is a PC5-RAL located above a PC5-RLC layer or a Uu-RAL located above a Uu-RLC layer, the second RAL is a Uu-RAL above the Uu-RLC layer or a PC5-RAL above the PC5-RLC layer, and the communication node is a remote terminal or a base station, wherein the relay terminal configures, for a relay-Uu-radio resource control (R-Uu-RRC) message which is a signaling message, the RAL PDU using the RAL PDU header not including the remote terminal identifier and the connection identifier, or configures the RAL PDU using the RAL PDU header including the remote terminal identifier and the connection identifier, and wherein the relay terminal configures, for a relay-Uu-service data adaptation protocol (R-Uu-SDAP) message for transferring user data, the RAL PDU using the RAL PDU header including the remote terminal identifier and the connection identifier.

7. The operation method according to claim 6, wherein the first RAL identifies the remote terminal identifier and the connection identifier from a received RAL PDU header.

8. The operation method according to claim 6, wherein the first RAL identifies the remote terminal identifier and the connection identifier associated with an RLC channel through which a received RAL PDU is transmitted.

9. The operation method according to claim 6, wherein an RAL PDU header received in the first RAL is delivered to the second RAL, and the second RAL generates the RAL PDU of the second RAL by using the received RAL PDU header identically.

10. The operation method according to claim 6, further comprising activating the first RAL and the second RAL in the relay terminal, wherein the remote terminal identifier and the connection identifier are configured in the activating of the first RAL and the second RAL.

11. The operation method according to claim 6, further comprising:

extracting, by the first RAL, data by removing an RAL PDU header from a received RAL PDU;

delivering, by the first RAL, the data to the second RAL; and generating, by the second RAL, an RAL PDU only with the data, or generating, by the second RAL, an RAL PDU with the data and an RAL PDU header including the remote terminal identifier and the connection identifier.

* * * * *